United States Patent
Lim et al.

(10) Patent No.: US 9,047,023 B2
(45) Date of Patent: Jun. 2, 2015

(54) HOST DEVICE, MANAGING SERVER AND METHOD OF CONTROLLING IMAGE FORMATION THEREOF

(75) Inventors: Jong-yoon Lim, Suwon-si (KR); Lye-suk Lee, Suwon-si (KR); Byung-oh Park, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 13/523,081

(22) Filed: Jun. 14, 2012

(65) Prior Publication Data

US 2013/0024913 A1    Jan. 24, 2013

(30) Foreign Application Priority Data

Jul. 19, 2011  (KR) .................. 10-2011-0071622

(51) Int. Cl.
*G06F 21/00*   (2013.01)
*G06F 3/12*    (2006.01)
*G06F 15/173*  (2006.01)

(52) U.S. Cl.
CPC ............ *G06F 3/1204* (2013.01); *G06F 3/1222* (2013.01); *G06F 3/1232* (2013.01); *G06F 3/1239* (2013.01); *G06F 3/1288* (2013.01)

(58) Field of Classification Search
CPC ... G06F 3/1204; G06F 3/1205; G06F 3/1222; G06F 3/1288; G06F 3/1232; G06F 11/3055; G06F 17/30; H04N 1/00954; H04N 1/32502; H04N 1/4413; H04N 1/00408; H04N 1/00188
USPC ........ 726/1–5; 358/1.13, 1.14, 1.15; 370/431; 709/223, 224
See application file for complete search history.

(56) References Cited

U.S. PATENT DOCUMENTS

| | | | |
|---|---|---|---|
| 2001/0035972 A1* | 11/2001 | Wurmfeld | ..................... 358/1.13 |
| 2002/0059372 A1 | 5/2002 | Goshev et al. | |
| 2008/0252922 A1 | 10/2008 | Ikegami et al. | |
| 2010/0245885 A1* | 9/2010 | Selvaraj | ........................ 358/1.15 |
| 2012/0069386 A1* | 3/2012 | St. Laurent et al. | ......... 358/1.15 |

OTHER PUBLICATIONS

European Search Report dated Aug. 14, 2013 issued in EP Application No. 12162758.2.
Step-by-Step Guide for Print Management; XP055074554; Retrieved from the Internet: http://technet.microsoft.com/en-us/library/cc755424%28v=ws.10%29.aspx, Aug. 22, 2005.

* cited by examiner

*Primary Examiner* — Kambiz Zand
*Assistant Examiner* — Noura Zoubair
(74) *Attorney, Agent, or Firm* — Staas & Halsey LLP

(57) ABSTRACT

A host device includes a user interface to receive user information to log in a managing server, a communication interface to transmit the user information to the managing server, a display unit, and a controller that, if login to the managing server is performed, controls the display unit to display information corresponding to an image forming apparatus connected to the host device.

21 Claims, 12 Drawing Sheets

FIG. 4C

| Collect Printer Information | |
|---|---|
| Collecting Information on Printers Installed In PC. | [ Device (1/4) ] |
| ▮▮▮▮▮▮▮ | |

FIG. 4D

| View Printer | | | | | |
|---|---|---|---|---|---|
| Name | IP | S/N | Status | Toner(C/M/Y/K) | JAC Setting Information |
| CLX-8385 Series | 192.168.1.100 | DLKJ213DSLK | Not Connected | 10/20/50/14 | Not Set |
| CLX-9250 9350 Series | 192.168.1.101 | F92KV81DFW | Normal | 90/30/20/30 | Not Set |
| SCX-6x55 Series | 192.168.1.102 | D93MFIU3JD | Normal | 50/50/50/50 | Not Set |
| CLP-660 | 192.168.1.103 | DFSKLVJKEKG | Paper Jam | 10/5/5/0 | Not Set |
| | | | | OK | Cancel |

FIG. 4E

| Select Printer | | | | | |
|---|---|---|---|---|---|
| Name | IP | S/N | Status | Toner(C/M/Y/K) | JAC Setting Information |
| ☐ CLX-8385 Series | 192.168.1.100 | DLKJ213DSLK | Not Connected | 10/20/50/14 | Not Set |
| ☑ CLX-9250 9350 Series | 192.168.1.101 | F92KV81DFW | Normal | 90/30/20/30 | Not Set |
| ☑ SCX-6x55 Series | 192.168.1.102 | D93MFIU3JD | Normal | 50/50/50/50 | Not Set |
| ☐ CLP-660 | 192.168.1.103 | DFSKLVJKEKG | Paper Jam | 10/5/5/0 | Not Set |
| | | | | OK | Cancel |

FIG. 4F

| Select Printer | | | | | |
|---|---|---|---|---|---|
| Name | IP | S/N | Status | Toner(C/M/Y/K) | JAC Setting Information |
| ☑ CLX-8385 Series | 192.168.1.100 | DLKJ213DSLK | Not Connected | 10/20/50/14 | Not Set |
| ☐ CLX-9250 9350 Series | 192.168.1.101 | F92KV81DFW | Normal | 90/30/20/30 | Set |
| ☐ SCX-6x55 Series | 192.168.1.102 | D93MFIU3JD | Normal | 50/50/50/50 | Set |
| ☑ CLP-660 | 192.168.1.103 | DFSKLVJKEKG | Paper Jam | 10/5/5/0 | Not Set |
| | | | | OK | Cancel |

| Select Printer | | | | | |
|---|---|---|---|---|---|
| Name | IP | S/N | Status | Toner(C/M/Y/K) | JAC Setting Information |
| ☐ CLX-8385 Series | 192.168.1.100 | DLKJ213DSLK | Not Connected | 10/20/50/14 | Not Set |
| ☐ CLX-9250 9350 Series | 192.168.1.101 | F92KV81DFW | Normal | 90/30/20/30 | Set |
| ☐ SCX-6x55 Series | 192.168.1.102 | D93MFIU3JD | Normal | 50/50/50/50 | Set |
| ☐ CLP-660 | 192.168.1.103 | DFSKLVJKEKG | Paper Jam | 10/5/5/0 | Not Set |
| ☑ SCX-1385 Series | 192.168.33.15 | EID212221DK | Normal | 20/20/20/20 | Not Set |
| ☑ SCX-2x55 | 192.168.33.16 | CVMC209DL | Normal | 30/20/20/70 | Not Set |
| | | | | OK | Cancel |

FIG. 4I

| Set Printer User Authority | |
|---|---|
| SCX-1385 Series(IP: 192.168.33.15, S/N: EID212221DK) | |
| Permitted User | King sejong |
| Permitted Group | Design Group 1 |
| | Modify |
| SCX-2x55(IP: 192.168.33.16, S/N: CVMC209DL) | |
| Permitted User | Goo KIM |
| Permitted Group | None |
| | Modify |
| CLX-9250 9350 Series(IP: 192.168.1.101, S/N: F92KV81DFW) | |
| Permitted User | All Users |
| Permitted Group | All Groups |
| | Modify |
| ⋮ | |

FIG. 4J

| Result of JAC Setting |
|---|
| Succeeded Printer List |
| CLX-9250 9350 Series(IP: 192.168.1.101, S/N: F92KV81DFW) |
| Failed Printer List |
| SCX-6x55 Series(IP: 192.168.1.102, S/N: D93MFIU3JD)<br>[Cause of Failure: No authority to use a corresponding printer] |
| OK |

FIG. 5A

| JKC User Information | | | | | |
|---|---|---|---|---|---|
| Name | ID | Password | Position | Department | Floor |
| Gil Dong HONG | abcd | **** | Manager | Marketing | 33rd floor |
| Chul Soo KIM | dfdc | **** | Director | Planning | 20th floor |
| Geokk Jeong IM | ckkckck | **** | Staff | R&D | 25th floor |
| Yak Yong JEONG | dkciek | **** | Assistant Manager | Sales | 2nd florr |
| | | | | | OK |

| CLX-8385 Series(S/N: DLKJ213DSLK) | | | | | | | | |
|---|---|---|---|---|---|---|---|---|
| User Name | ID | User Type | Print [Color] | Print [Mono] | Copy [Color] | Copy [Mono] | Fax | Scan |
| Gil Dong HONG | abcd | LDAP | U | U | U | U | U | U |
| Chul Soo KIM | dfdc | LDAP | U | U | U | U | U | U |

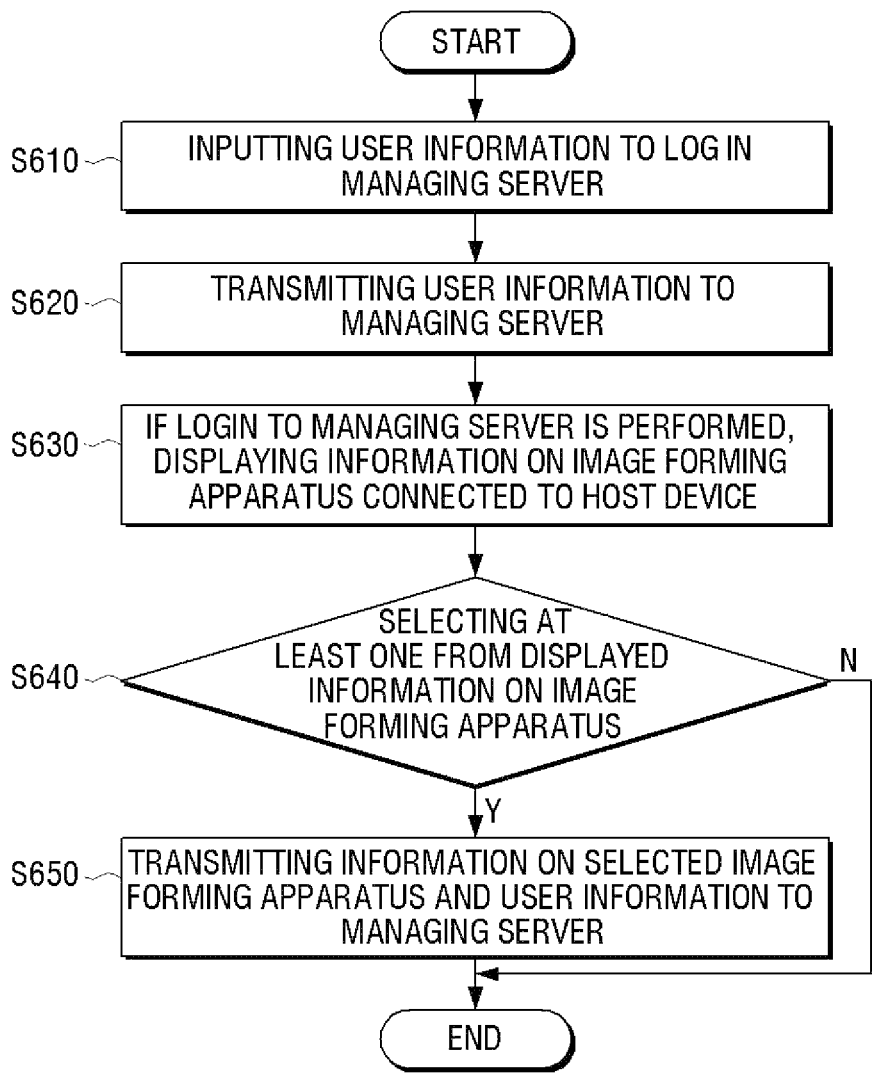

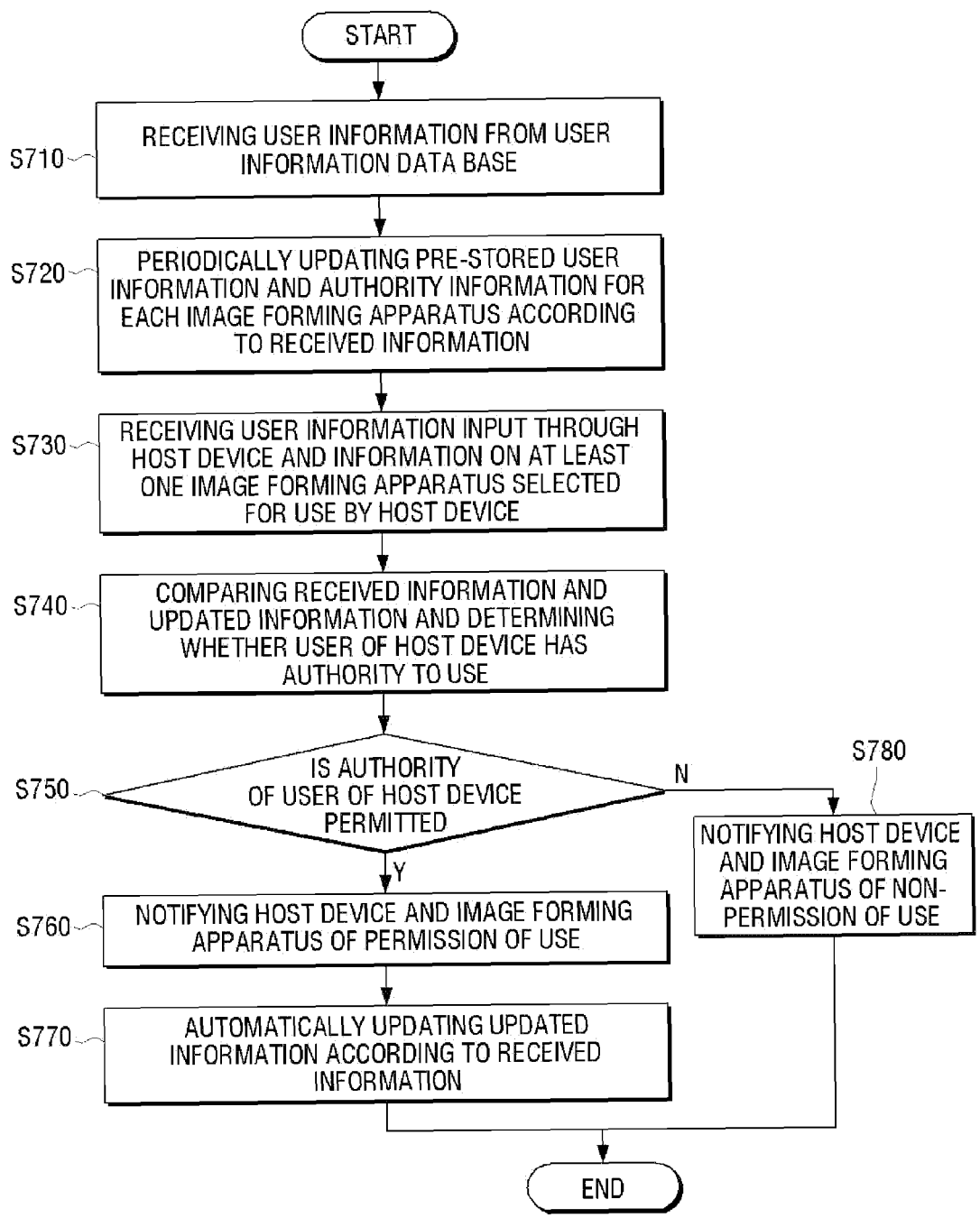

HOST DEVICE, MANAGING SERVER AND METHOD OF CONTROLLING IMAGE FORMATION THEREOF

CROSS-REFERENCE TO RELATED APPLICATIONS

This application claims priority under 35 U.S.C. §119 from Korean Patent Application No. 10-2011-0071622, filed on Jul. 19, 2011, in the Korean Intellectual Property Office, the disclosure of which is incorporated herein by reference in its entirety.

BACKGROUND

1. Field

The present general inventive concept relates to a host device, a managing server, and a method of controlling image formation thereof, and more particularly, to a host device and a managing server which are operated in a managed printing and service or solution (MPS) system environment, and a method of controlling image formation thereof.

2. Description of the Related Art

A conventional image forming apparatus prints print data generated in a terminal apparatus, such as a computer, on recording paper. Examples of such an image forming apparatus are copiers, printers, facsimile machines, or multifunction peripherals (MFP) that include functions of all the aforementioned devices in a single device.

Recently, public offices, universities, or companies provide a managing system such as a managed printing and service or solution (MPS) system to facilitate management of numerous image forming apparatuses.

The MPS system refers to a system that manages printers or MFPs in a network and a job (print, copy, fax, or scan) log thereof and processes business logic such as usage and corresponding charges on an individual or group basis through job accounting (JAC).

However, in a related-art method, an administrator may desire to add a plurality of users corresponding to each image forming apparatus directly via the MPS system for the JAC. In other words, the administrator would be required to conduct a preliminary search regarding who will use each image forming apparatus from the plurality of users.

Accordingly, it also is necessary to conduct a preliminary search on which department will be allocated each of the printers and which user will be allocated each of the printers. That is, actual users of each printer should be determined.

Further, the administrator should individually register the users who have been determined to be allocated each printer in the system, and should repeat the work to register, as the number of users and the number of printers increase.

Also, if there is a change in a personnel structure in a department or if a user desires to use a different printer other than the printer assigned to her/him due to a temporary problem of the printer, the administrator should be able reflect these changes to the system every time that the changes occur.

SUMMARY

The present general inventive concept provides a host device to transmit information on an image forming apparatus selected from a plurality of image forming apparatuses connected to the host device to a managing server in a managed printing and service or solution (MPS) system environment, so that the managing server determines authority of a user.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a host device including a user interface to receive user information to log in a managing server, a communication interface to transmit the user information to the managing server, a display unit, and a controller that, if login to the managing server is performed, controls the display unit to display information corresponding to an image forming apparatus connected to the host device.

If at least one image forming apparatus is selected from the displayed information corresponding to the image forming apparatus, the controller may control the communication interface to transmit information corresponding to the selected image forming apparatus and the user information to the managing server.

If use permission information determined according to the information of the selected image forming apparatus and the user information is received from the managing server, the controller may control to perform an image forming job using the selected image forming apparatus.

If use permission information or use non-permission information determined according to the information corresponding to the selected image forming apparatus and the user information is received from the managing server, the controller may control the display unit to display a use permission or non-permission state of the selected image forming apparatus.

The display unit may display a screen including a login menu, and, if the login menu is selected, may display a screen to receive the user information The controller may transmit the input user information to the managing server, and, if a login completion signal is received from the managing server, may control the display unit to display information corresponding to at least one image forming apparatus connected to the host device.

The display unit may display at least one of a search menu to search an image forming apparatus connected to the host device, a view menu to display information corresponding to the searched image forming apparatus, and a selecting menu to select at least one of the searched image forming apparatus, along with the login menu.

The host device may further include a storage unit, and, if the login to the managing server is performed or if the search menu is selected, the controller may detect at least one of a name, IP information, driver information, serial number information, state information, toner information, and JAC setting information of the at least one image forming apparatus connected to the host device, and store the detected information in the storage unit and display the detected information.

The foregoing and/or other features and utilities of the present general inventive concept may also be achieved by providing a managing server including a storage unit to store user information and authority information corresponding to each image forming apparatus and to be updated periodically according to the user information provided from a user information database, a communication interface to receive user information input through a host device and information corresponding to at least one image forming apparatus selected by the host device, and a controller to compare the information received through the communication interface and the information stored in the storage unit and determine whether a user of the host device has authority to use the host device, and notify the host device and the image forming apparatus of a result of determination.

If the authority of the user of the host device is permitted, the controller may update the information of the storage unit automatically according to the information received through the communication interface.

The managing server may further include a user interface to receive the user information and the authority information corresponding to each image forming apparatus.

The managing server may further include a display unit to display the user information and the authority information corresponding to each image forming apparatus.

The foregoing and/or other features and utilities of the present general inventive concept may also be achieved by providing a method of controlling image formation of a host device, the method including receiving user information to log in a managing server, transmitting the user information to the managing server, if login to the managing server is performed, displaying information corresponding to an image forming apparatus connected to the host device, selecting at least one image forming apparatus from the displayed information on the image forming apparatus, and transmitting information on the selected image forming apparatus and the user information to the managing server.

The method may further include, if use permission information determined according to the information on the selected image forming apparatus and the user information is received from the managing server, performing an image forming job using the selected image forming apparatus.

The method may further include, if use permission information or use non-permission information determined according to the information corresponding to the selected image forming apparatus and the user information is received from the managing server, displaying a use permission or non-permission state of the selected image forming apparatus.

The receiving of the user information may include displaying a screen including a login menu and displaying a screen to receive the user information, if the login menu is selected, and the displaying the information corresponding to the image forming apparatus connected to the host device may include, if a login completion signal is received from the managing server, displaying information on at least one image forming apparatus connected to the host device.

The method may further include displaying at least one of a search menu to search an image forming apparatus connected to the host device, a view menu to display information on the searched image forming apparatus, and a selecting menu to select one of the searched image forming apparatus, along with the login menu.

The method may further include, if the login to the managing server is performed or if the search menu is selected, detecting and storing at least one of a name, IP information, driver information, serial number information, state information, toner information, and JAC setting information of at least one image forming apparatus connected to the host device, and displaying the detected and stored information.

The foregoing and/or other features and utilities of the present general inventive concept may also be achieved by providing a method of controlling image formation of a managing server, the method including receiving user information from a user information database and updating pre-stored user information and authority information corresponding to each image forming apparatus periodically according to the received information, receiving user information input through a host device and information corresponding to at least one image forming apparatus selected to be used by the host device, comparing the received information and the updated information and determining whether a user of the host device has authority to use the host device, and notifying the host device and the image forming apparatus of the authority of the user.

The determining may include, if the authority of the user of the host device is permitted, automatically updating the updated information according to the received information.

The method may further include receiving the user information and the authority information corresponding to each image forming apparatus.

The method may further include displaying the user information and the authority information corresponding to each image forming apparatus.

The foregoing and/or other features and utilities of the present general inventive concept may also be achieved by providing a recording medium in which a program code to perform a method of controlling image formation of a host device is stored, the method corresponding to controlling the image formation including: receiving user information to log in a managing server, transmitting the user information to the managing server, if login to the managing server is performed, displaying information corresponding to an image forming apparatus connected to the host device, selecting at least one image forming apparatus from the displayed information corresponding to the image forming apparatus, and transmitting information corresponding to the selected image forming apparatus and the user information to the managing server.

The recording medium may further include, if use permission information or use non-permission information determined according to the information corresponding to the selected image forming apparatus and the user information is received from the managing server, displaying a use permission or non-permission state of the selected image forming apparatus.

The foregoing and/or other features and utilities of the present general inventive concept may also be achieved by providing an image forming system, including a host device, including a user interface to receive user information from a user, a communication interface to connect the host to an external managing server based on the received user information, a display unit to display information stored on the external managing server and corresponding to an external image forming apparatus, to allow the user to select the external image forming apparatus and a controller to transmit the user information and the information corresponding to the selected external image forming apparatus to the external managing server to verify whether the information corresponding to the selected external image forming apparatus matches the user information.

The user may receive permission to use the selected external image forming apparatus from the external managing server if the information corresponding to the selected external image forming apparatus matches the user information.

The display unit may display use permission information or use non-permission information corresponding to the selected external image forming apparatus based on whether the information corresponding to the selected external image forming apparatus matches the user information.

BRIEF DESCRIPTION OF THE DRAWINGS

These and/or other features and utilities of the present general inventive concept will become apparent and more readily appreciated from the following description of the embodiments, taken in conjunction with the accompanying drawings of which:

FIGS. 4A through 4J are views to explain an operational characteristic of the host device of FIG. 2 of the present general inventive concept;

FIGS. 5A through 5E are views to explain an operational characteristic of the managing server of FIG. 3 of the present general inventive concept;

FIG. 6 is a flowchart illustrating a method of controlling image formation of a host device according to an exemplary embodiment of the present general inventive concept; and FIG. 7 is a flowchart illustrating a method of controlling image formation of a managing server according to an exemplary embodiment of the present general inventive concept.

DETAILED DESCRIPTION OF THE PREFERRED EMBODIMENTS

Figure 1:
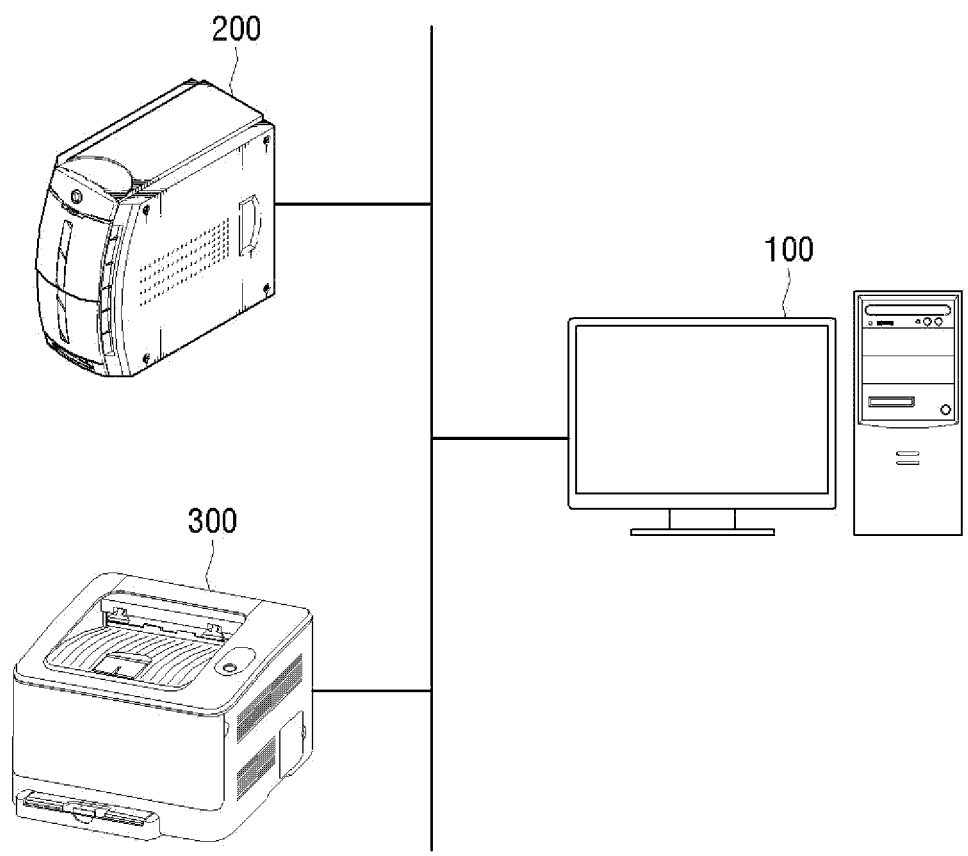
FIG. 1 is a block diagram illustrating an image forming system according to an exemplary embodiment of the present general inventive concept.

Reference will now be made in detail to the embodiments of the present general inventive concept, examples of which are illustrated in the accompanying drawings, wherein like reference numerals refer to like elements throughout. The embodiments are described below in order to explain the present general inventive concept by referring to the figures.

FIG. 1 is a block diagram illustrating an image forming system according to an exemplary embodiment. Referring to FIG. 1, an image forming system includes a host device 100, a managing server 200, and an image forming apparatus 300. The image forming system may be an MPS system.

The host device 100 is connected to the managing server 200 and the image forming apparatus 300. When a login operation to the managing server 200 is performed, the host device 100 logs in using user information registered in the managing server 200, and displays information corresponding to the image forming apparatus 300 connected to the host device 100. The host device 100 stores the information corresponding to the image forming apparatus 300 connected to the host device 100. The host device 100 provides a user interface to select information corresponding to at least one image forming apparatus (that is, an image forming apparatus that a user wishes to use) from the stored or displayed information corresponding to the image forming apparatus. The host device 100 transmits the information corresponding to the selected image forming apparatus and the user information to the managing server 200. If use permission information or use non-permission information determined according to the information corresponding to the selected image forming apparatus and the user information is received from the managing server 200, the host device 100 displays a use permission or non-permission state of the selected image forming apparatus on a display unit. A detailed configuration and operation of the host device 100 will be explained below with reference to FIG. 2. Any device that can control the operation of the image forming apparatus 300 may be used as the host device 100. For example, the host device 100 may be a terminal device such as a personal computer.

The managing server 200 is connected to the host device 100 and the image forming apparatus 300. The managing server 200 stores user information and authority information corresponding to each image forming apparatus. The user information refers to an ID and a password corresponding to each user. The authority information corresponding to each image forming apparatus indicates who has authority to use an image forming apparatus and which image forming apparatus is permitted to be used by a user, or indicates which department has authority to use an image forming apparatus and which image forming apparatus is permitted to be used by a department to which a user belongs. The authority information corresponding to each image forming apparatus is stored in a form of a list containing at least one user corresponding to each image forming apparatus. Also, the managing server 200 is periodically updated according to user information provided from a user information database. That is, the managing server 200 is associated with the user information database to allow a user to be added, deleted or changed, and accordingly, the user information and the authority information corresponding to each image forming apparatus may be updated. The user information database may be a lightweight directory access protocol (LDAP) server. The managing server 200 receives the user information input through the host device 100 and the information on the at least one image forming apparatus selected to be used by the host device 100. The managing server 200 compares the received information (the user information input through the host device 100 and the information corresponding to the at least one image forming apparatus selected to be used by the host device 100) and the information stored in the managing server 200 (the user information and the authority information corresponding to each image forming apparatus), determines whether the user of the host device 100 has the authority to use the selected at least one image forming apparatus, and notifies the host device 100 and the image forming apparatus 300 of a result of the determination. A detailed configuration and operation of the managing server 200 will be explained in detail below with reference to FIG. 3. Any type of server may be used as the managing server 200, and in particular, an MPS server may be used.

Figure 2:
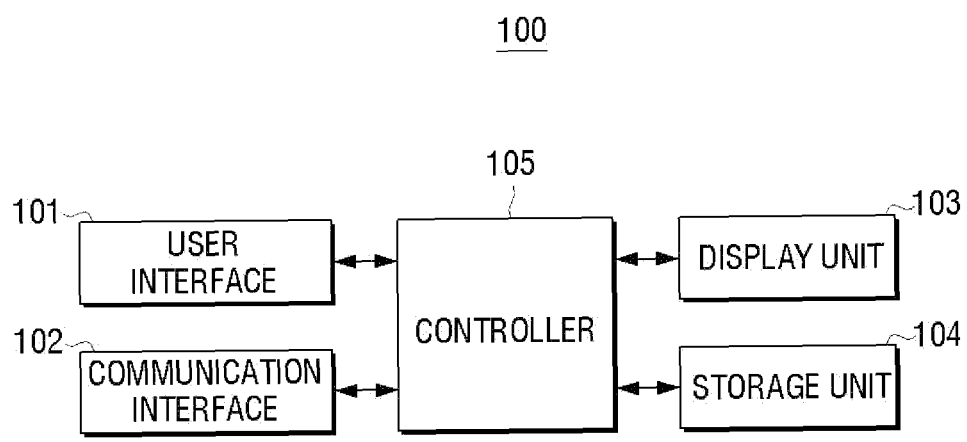
FIG. 2 is a block diagram illustrating a host device according to an exemplary embodiment of the present general inventive concept.

As stated above with reference to FIGS. 1 and 2, the image forming apparatus 300 is connected to the host device 100 and the managing server 200, and performs an image forming operation according to a request from the host device 100. More specifically, if the use permission information determined according to the information corresponding to the selected image forming apparatus and the user information are transmitted to the host device 100 from the managing server 200, the host device 100 performs an image forming operation using the selected image forming apparatus. The image forming apparatus 300 may be a copier, a printer, a facsimile machine, or a multi-function peripheral (MFP) including functions of the aforementioned devices in a single device.

Although one host device 100, one managing server 200, and one image forming apparatus 300 are illustrated in FIG. 1, a plurality of host devices 100, a plurality of managing servers 200, and a plurality of image forming apparatuses 300 may be provided. For example, the plurality of image forming apparatuses 300 may be connected to the plurality of host devices 100. Accordingly, the plurality of image forming apparatuses 300 may include various apparatuses such as copiers, printers, facsimile machines, and MFPs.

Also, although the image forming system of FIG. 1 is established in a single network, it may be established in a plurality of different networks. Accordingly, a relaying apparatus to relay communication among the different networks may be provided.

FIG. 2 is a block diagram illustrating the host device 100 according to an exemplary embodiment. Referring to FIG. 2, the host device 100 includes a user interface 101, a communication interface 102, a display unit 103, a storage unit 104, and a controller 105.

The user interface 101 allows a user to set or select various functions supported by the host device 100.

The user interface 101 may display a user interface window (UI) to receive user information to log into the managing server 200. In other words, to perform the login, the user may, for example, type in the user information, which may include a user name, a user password, a user code, etc.

A login menu may be displayed on the user interface window (UI) along with at least one of a search menu to search an image forming apparatus 300 connected to the host device 100, a view menu to display information corresponding to the searched image forming apparatus 300, and a selecting menu to select one of the searched image forming apparatuses 300.

The user interface 101 may include a device performing input and output simultaneously such as a touch pad, or may include a device combining an input device such as a mouse and a keyboard and a display device such as a CRT monitor, an LCD monitor, and an LED.

The communication interface 102 connects the host device 100 to the managing server 200 and the image forming apparatus 300.

The communication interface 102 may transmit the user information to the managing server 200, if the login is performed using the user interface 101.

Also, if at least one image forming apparatuses 300 is selected from the information corresponding to the image forming apparatus 300 displayed on the display unit 130, the communication interface 102 may transmit information on the selected image forming apparatus 300 to the managing server 200.

Also, the communication interface 102 receives use permission information determined according to the information corresponding to the selected image forming apparatus 300 and the user information from the managing server 200, and transmits a command to perform an image forming operation using the selected image forming apparatus 300.

The communication interface 102 may be provided to connect the host device 100 to the managing server 200 and the image forming apparatus 300, and may include a wireless or wired access through a local area network (LAN) and the internet, or access through a universal serial bus (USB) port.

The display unit 103 displays various operations of the host device 100.

The display unit 103 displays various functions of the user interface 101 so that the user sets and/or selects them. That is, the display unit 103 may display at least one of the search menu to search the image forming apparatus 300 connected to the host device 100, the view menu to display the information on the searched image forming apparatus 300, and the selecting menu to select one of the searched image forming apparatus 300, along with the login menu on the user interface window (UI). Also, the display unit 103 may display a screen under control of the controller 105, which will be described below.

The display unit 103 may display information on an image forming apparatus 300 that is permitted to be used, and information such as a quarter state (for example, a degree of availability for print, scan, copy, and fax).

The display unit 103 may include at least one of a liquid crystal display, a thin film transistor-liquid crystal display, an organic light-emitting diode, a flexible display, and a 3-dimensional (3D) display.

The storage unit 140 may store various programs and data necessary to drive the host device 100 and the image forming apparatus 300.

If a login to the managing server 200 is performed, the storage unit 104 may be controlled by the controller 105 to store at least one of a name, IP information, driver information, serial number information, state information, toner information, and JAC setting information of the at least one image forming apparatus connected to the host device 100. The storage unit 104 may include an embedded storage element or a removable storage element.

The controller 105 controls the user interface 101, the communication interface 102, the display unit 103, and the storage unit 104.

If the login to the managing server 200 is performed, the controller 105 may control the display unit 103 to display the information corresponding to the image forming apparatus 300 connected to the host device 100. That is, the controller 105 controls the communication interface 102 to transmit the user information (ID and password) that is input by selecting the login menu displayed on the display unit 103 to the managing server 200. If a login completion signal is received from the managing server 200 through the communication interface 102, the controller 105 searches the at least one image forming apparatus 300 connected to the host device 100. Therefore, if the user information input at the time of logging in is stored in the managing server 200, the login may be successful.

The information corresponding to the searched at least one image forming apparatus 300 includes at least one of a name, IP information, driver information, serial number information, state information, toner information, JAC setting information of the at least one image forming apparatus connected to the host device 100. The controller 105 detects the information corresponding to the searched image forming apparatus 300 and stores the detected information in the storage unit 104.

If the view menu displayed on the display unit 103 is selected through the user interface 101, the controller 105 may control the display unit 103 to display the stored information on the image forming apparatus 300.

If the selecting menu displayed on the display unit 103 is selected through the user interface 101, the controller 105 may control the display unit 103 to display a selecting window to select one of the at least one image forming apparatus corresponding to the information corresponding to the image forming apparatus 300 stored in the storage unit 104.

If the search menu displayed on the display unit 103 is selected through the user interface 101, the controller 105 may control the display unit 103 to display a search window to search the at least one image forming apparatus 300 connected to the host device 100. The search menu is to search the at least one image forming apparatus 300 connected to the host device 100, and may be used to search a new image forming apparatus 300, if the user moves to a different network environment from a previously used network environment. The search recited herein includes an automatic search mode and a manual search mode (in which the user directly inputs an IP and searches an image forming apparatus connected to a host device).

If at least one image forming apparatus 300 is selected from the information on the image forming apparatus 300, the controller 105 may control the communication interface 102 to transmit the information corresponding to the selected image forming apparatus 300 and the user information to the managing server 200.

If the use permission information determined according to the information of the selected image forming apparatus 300 and the user information (indicating that the user of the host device 100 is permitted to use the selected image forming apparatus 300) is received from the managing server 200, the controller 105 may control to perform an image forming operation using the selected image forming apparatus 300.

Also, if the use permission information or the user non-permission information determined according to the information on the selected image forming apparatus 300 and the user information is received from the managing server 200, the controller 105 may control the display unit 103 to display a use permission or non-permission state of the selected image forming apparatus 300.

If a driver corresponding to the image forming apparatus 300 connected to the host device 100 is not installed in the host device 100, the controller 105 may install the driver corresponding to the image forming apparatus 300 manually or automatically and store the driver.

As described above, the host device 100 according to the exemplary embodiment selects the image forming apparatus 300 that the user wishes to use and transmits the information on the image forming apparatus 300 to the managing server 200, so that JAC setting can be achieved or released without intervention by an administrator when the printing environment of the user is changed.

Figure 3:
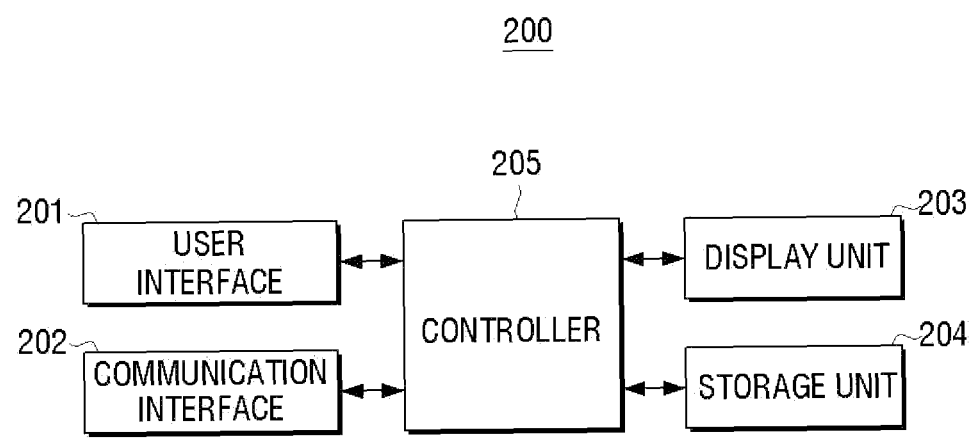
FIG. 3 is a block diagram illustrating a managing server according to an exemplary embodiment of the present general inventive concept.

FIG. 3 is a block diagram illustrating the managing server 200 according to an exemplary embodiment. Referring to FIG. 3, the managing server 200 includes a user interface 201, a communication interface 202, a display unit 203, a storage unit 204, and a controller 205.

The user interface 201 allows a user to set and/or select various functions supported by the managing server 200.

More specifically, the user interface 201 may receive user information that is added to, changed in, or deleted from the managing server 200, and may receive authority information of each user corresponding to each image forming apparatus 300. The user interface 201 may include input devices such as a touch pad, a mouse, or a keyboard and a display device such as a CRT monitor, an LCD monitor, and an LED.

The communication interface 202 connects the managing server 200 to the host device 100 and the image forming apparatus 300.

More specifically, the communication interface 202 may receive user information input through the host device 100 and information on at least one image forming apparatus 300 selected by the host device 100.

If authority of a user of the host device 100 is permitted or not permitted, information on the authority may be transmitted to the host device 100 and the image forming apparatus 300. The communication interface 202 may a wireless or wired access through a LAN and the internet, and also may access through a USB port.

The display unit 203 displays various operations of the managing server 200.

The display unit 103 may display user information and authority information corresponding to each image forming apparatus 300 stored in the storage unit 204. The display unit 203 may include at least one of a liquid crystal display, a thin film transistor-liquid crystal display, an organic light-emitting diode, a flexible display, and a 3D display.

The storage unit 204 stores various programs and data necessary to drive the managing server 200.

The storage unit 204 stores the user information and the authority information corresponding to each image forming apparatus 300, and is associated with a user information database (for example, an LDAP) so that the user information is periodically updated if a user is added, deleted, or changed. The storage unit 204 may be realized by an embedded storage element or a removable storage element.

The controller 205 controls the user interface 201, the communication interface 202, the display unit 203, and the storage unit 204.

The controller 205 compares the user information input through the host device 100 and received through the communication interface 202 and the information corresponding to the at least one image forming apparatus 300 selected by the host device 100, and the user information and the authority information corresponding to each image forming apparatus 300 stored in the storage unit 204.

If the storage unit 204 has the user information input through the host device 100 and has the authority to use an image forming apparatus 300 corresponding to the information corresponding to the at least one image forming apparatus 300 selected by the host device 100, the user is permitted to have the authority to use the image forming apparatus 300.

If the storage unit 204 has the user information input through the host device 100 but does not have the authority to use the image forming apparatus 300 corresponding to the information corresponding to the at least one image forming apparatus 300 selected by the host device, the user is not permitted to have the authority to use the image forming apparatus 300.

If the storage unit 204 does not have the user information input through the host device 100, it is apparent that the login itself fails and no information is transmitted to the managing server 200.

If the permission/non-permission of the authority is determined, the controller 205 may control the communication interface 202 to notify the host device 100 and the image forming apparatus 300 of a result of the determination.

Also, if the authority of the user of the host device 100 is permitted, the controller 205 may control the storage unit 204 to update the user information and the authority information corresponding to each image forming apparatus 300 stored in the storage unit 204 according to the user information and the information on the image forming apparatus 300 received through the communication interface 202. That is, the controller 205 may control the storage unit 204 to update the user information that is permitted corresponding to each image forming apparatus.

As described above, the managing server 200 according to the exemplary embodiment is associated with the user database so that JAC setting can be achieved without intervention by the user, if a user is added, deleted, or changed.

FIGS. 4A through 4K are views to explain an operational characteristic of the host device of FIG. 2, In FIGS. 4A through 4K, the image forming apparatus 300 will be described as a printer. However, this should not be considered as limiting and any image forming apparatus can be applied.

Figure 4A:
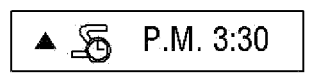

An application of FIG. 4A is automatically driven at the same time that the host device 100 starts, and an execution state is displayed on a desk bar and the application resides and performs its function until the host device 100 terminates. An icon of FIG. 4A may include one or more symbols and a time.

Figure 4B:
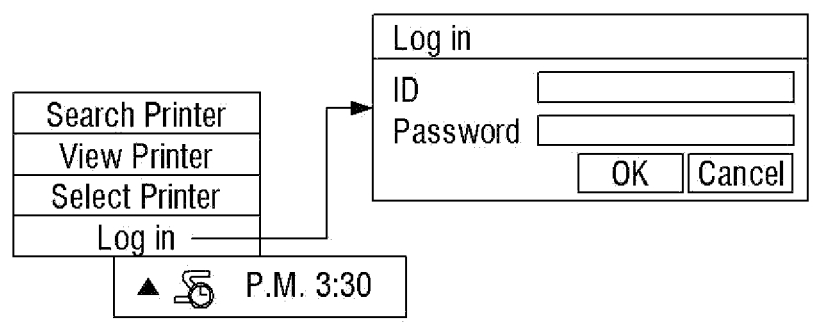

A user can view menus provided by the application by clicking the icon of FIG. 4A. If the user selects a login menu among the viewed menus to log in as illustrated in FIG. 4B, a window to input user information (ID and password) is generated as illustrated on a left portion of FIG. 4B. The user can access the managing server 200 by inputting user information, and, if the user information is not identical to user information stored in the managing server 200, the user fails to log in and no information is transmitted to the managing server 200.

If the user succeeds in logging in, the application collects information on printers connected to the host device 10 of the user as illustrated in FIG. 4C. The information on the printers includes at least one of a name (for example, CLX-9250 9350 Series and SCX-6X55 Series), IP information (an IP address of each printer), driver information, serial number information, state information (a connection/disconnection state of each printer or a paper jam state), toner information (an amount of CMYK toners), and JAC setting information (information regarding whether JAC of printers is set in the host device 100, that is, whether the printer is used) of the printer.

FIG. 4D is a view displaying information corresponding to searched printers that are connected to the host device 100, if a view menu is selected.

FIG. 4E is a view to select at least one printer corresponding to the information corresponding to printers connected to the host device 100 and searched as illustrated in FIG. 4C, if a selecting menu is selected. In FIG. 4E, CLX-9250 9350 Series and SCX-6X55 Series are selected.

FIG. 4F is a view illustrating a selecting screen in which printers (CLX-9250 9350 Series and SCX-6X55 Series) that have been already selected are displayed with an message 'Set' in JAC setting information. This is because CLX-9250 9350 Series and SCX-6X55 Series have been selected and used. If CLX-8385 series and CLP-660 in which the JAC is not set are selected and an OK button is pressed in this state as illustrated in FIG. 4F, the host device 100 requests the managing server 200 to set the authority for the selected printers, and, if the request is permitted, the JAC setting information is changed to 'Set'.

Figures 4G, 4H:
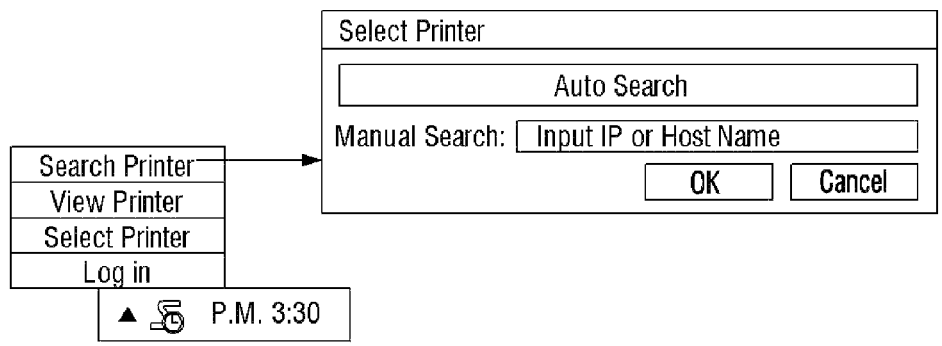

If the user moves a different network environment from an already used network environment for any reason while using the application, the user may search printers connected to the host device 100 manually or automatically as illustrated in FIG. 4G. In this case, printers that are searched in the new network environment may be used and displayed as illustrated in FIG. 4H.

If the host device 100 requests the managing server 200 to set the authority corresponding to printers (SCX-1385 Series and SCX-2X55) corresponding to information corresponding to the printers selected as illustrated in FIG. 4H, the managing server 200 determines whether the user has the authority use the selected printers. The authority is determined by comparing the user information with authority information corresponding to each printer stored in the managing server 200 as illustrated in FIG. 4I. The authority information corresponding to each printer may be modified through the user interface. As illustrated in FIG. 4I, the authority information corresponding to each printer is stored separately according to each printer. If the user of the host device 100 selects SCX-1385 Series by setting the JAC, the managing server 200 determines whether the user of the host device has the authority to access the printer. For example, if the user is neither 'King Sejong' nor 'Design Group 1', the user is not permitted to use the printer SCX-138 Series and the authority is not permitted. In the case that the printer CXL-9250 9350 Series are permissible for all of the users and all of the groups, if the user of the host device 100 selects the printer CLX-9250 9350 Series by setting the JAC, the authority is permitted and printing is performed using CLX-9250 9350 Series.

FIG. 4J is a view illustrating a screen to notify the host device 100 whether the user has the authority to use the selected printers, if CLX-9250 9350 Series and SCX-6X55 Series are selected. It can be seen that CLX-9250 9350 Series has succeeded and SCX-6X55 Series has failed. Here, the JAC setting information indicates that the JAC for CLX-9250 9350 Series is set.

As illustrated in FIGS. 4A through 4J, the application periodically monitors a list of printers selected by the user, and transmits the information on the selected printers and the user information at the time that the printer is initially selected and every time that changes occur. If the JAC setting corresponding to the selected printer is completed based on the information received by the managing server 200, the user prints using the printer in which the JAC is set.

FIGS. 5A through 5E are views illustrating an operational characteristic of the managing server of FIG. 3.

In FIGS. 5A through 5E, the image forming apparatus 300 will be described as a printer. However, this should not be considered as limiting and any image forming apparatus can be applied.

The managing server 200 is associated with the user information database (for example, an LDAP) and thus is periodically updated, if a user is added, deleted, or changed.

FIG. 5A is a view displaying user information periodically updated by the managing server 200. As illustrated in FIG. 5A, in the case that user "Gil Dong HONG" is registered as a user, if user 'Gil Dong HONG' resigns or moves to a different department, the managing server 200 removes 'Gil Dong HONG' from the user information or changes his department automatically in association with the user information database.

The managing server 200 may receive user information and information on a selected printer from the host device 100, and determines whether the user has the authority to use the selected printer.

If the authority is permitted, user information is added and stored with reference to the printer in relation to the user authority corresponding to each printer. Also, if the user information of the printer is changed, the corresponding user information is updated.

Figure 5B:
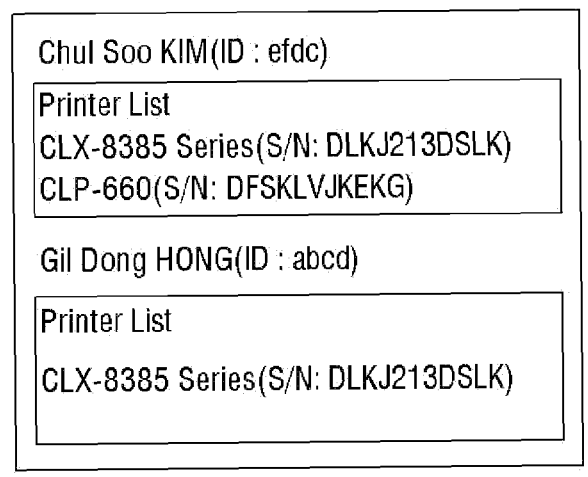

FIG. 5B is a view displaying the user information and the information on the selected printer transmitted from the host device 100. FIG. 5B illustrates that 'Chul Soo KIM' is the user information and 'CLX-8385 Series and CLP-660' is the information on the selected printer, which are transmitted to the managing server.

Figure 5C:
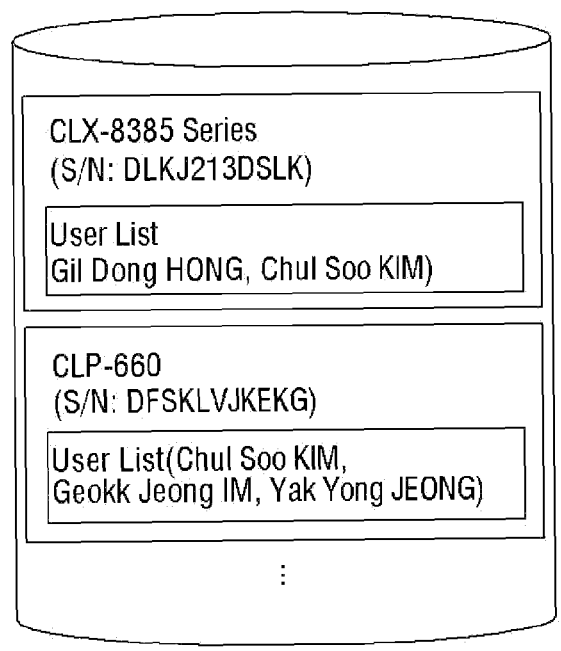

FIG. 5C is a view displaying user authority information corresponding to each printer stored in the storage unit of the managing server 200. If the authority corresponding to the printers selected by 'Chul Soo KIM' and 'Gil Dong HONG' is permitted based on the information illustrated in FIG. 5B, the user authority information corresponding to each printer stored in the storage unit of the managing server 200 is illustrated in FIG. 5C. Since 'Chul Soo KIM' selects 'CLX-8385 Series' and 'CLP-660', 'Chul Soo KIM' is added to 'CLX-8385 Series' and stored, and 'Chul Soo KIM' is also added to 'CLP-660' and stored. That is, the managing server 200 adds the user separately according to each printer and stores the user.

Figures 5D, 5E:
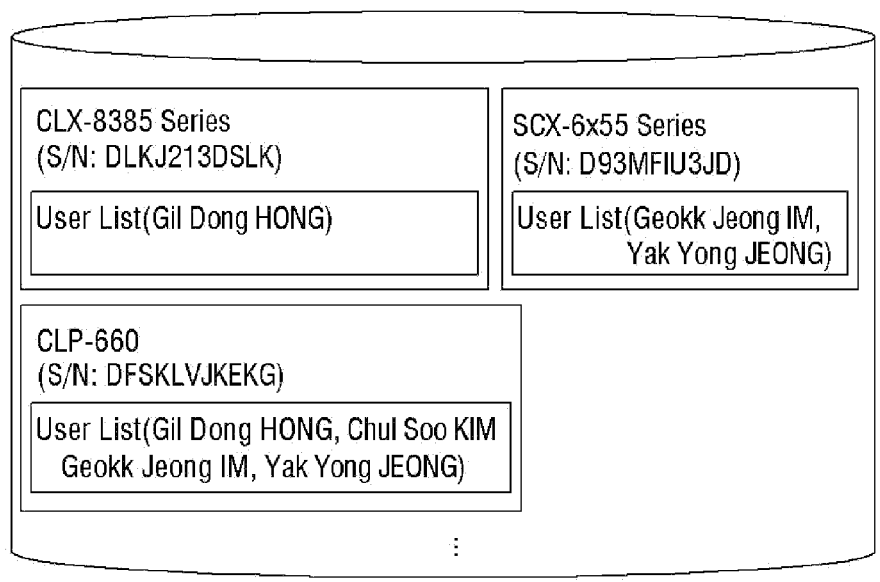

FIG. 5D is a view illustrating how the storage unit is updated, if the user authority information corresponding to each printer is changed. It can be seen from FIG. 5D that 'Gil Dong HONG' is added to 'CLP-660'. This means that 'Gil Dong HONG' selects 'CLP-660' through the host device 100 and the managing server 200 confirms that there is user information of 'Gil Dong HONG' and 'Gil Dong HONG' has the authority to use 'CLP-660' and thus update the storage unit by adding 'Gil Dong HONG.'

FIG. 5E illustrates quarter values of users corresponding to each printer. In FIG. 5E, 'U' means a unlimited quarter value and thus 'Gil Dong HONG' can use print, copy, fax, and scan without limit.

FIG. 6 is a flowchart illustrating a method of controlling image formation of a host device according to an exemplary embodiment of the present general inventive concept.

Referring to FIG. 6, a user inputs user information to log in a managing server at operation S610. Accordingly, a user interface window may be displayed as illustrated in FIG. 4B.

The input user information is transmitted to the managing server at operation S620. If the login to the managing server is performed, information corresponding to an image forming apparatus connected to a host device may be displayed at operation S630. In this case, the information on the image forming apparatus connected to the host device is searched as illustrated in FIG. 4C, and, if a selecting menu is selected, the user interface window illustrated in FIG. 4D is displayed.

If at least one image forming apparatus is selected from the displayed information corresponding to the image forming apparatus at operation S640: Y, information corresponding to the selected image forming apparatus and the user information are transmitted to the managing server at operation S650. If the at least one image forming apparatus is not selected from the displayed information corresponding to the image forming apparatus at operation S640: N, the information corresponding to the image forming apparatus and the user information are not transmitted to the managing server.

FIG. 7 is a flowchart illustrating a method of controlling image formation of a managing server according to an exemplary embodiment.

Referring to FIG. 7, the managing server receives user information from the user information database at operation S710. Already stored user information and authority information corresponding to each image forming apparatus are periodically updated according to the received information at operation S720. The managing server receives user information input through a host device and information corresponding to at least one image forming apparatus selected by the host device at operation S730. The managing server compares the received information and the updated information and determines whether a user of the host device has the authority to use the host device at operation S740.

If the authority of the user of the host device is permitted at operation S750: Y, the managing server notifies the host device and the image forming apparatus of permission of the use at operation S760. The updated information is automatically updated according to the received information at operation S770.

If the authority of the user of the host device is not permitted at operation S750: N, the managing server notifies the host device and the image forming apparatus of non-permission of the use at operation S780.

As described above, according to the various exemplary embodiments, a real user can be automatically added or set for a plurality of printers without intervention by an administrator in an MPS system environment.

Also, if an organization is changed and thus a printing environment of a user is changed, JAC setting can be achieved or released without intervention by an administrator.

If a user is added or removed, JAC setting can be actively achieved without intervention by an administrator.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, DVDs, magnetic tapes, floppy disks, and optical data storage devices. The computer-readable recording medium can also be distributed over network coupled computer systems so that the computer-readable code is stored and executed in a distributed fashion. The computer-readable transmission medium can generate or transmit carrier waves or signals (e.g., wired or wireless data transmission through the Internet). Also, functional programs, codes, and code segments to accomplish the present general inventive concept can be easily construed by programmers skilled in the art to which the present general inventive concept pertains Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A host device connected to a plurality of image forming apparatuses and a managing server, comprising:
   a user interface to receive user information to log in the managing server;
   a communication interface to transmit the user information to the managing server;
   a display unit; and
   a controller to control the display unit to display information corresponding to the image forming apparatuses connected to the host device after a login to the managing server has been performed, such that the displayed information includes at least three of a name, Internet Protocol (IP) information, driver information, serial number information, state information, toner information, and job accounting (JAC) setting information of the image forming apparatuses connected to the host device,
   wherein, if at least one image forming apparatus is selected from the displayed information corresponding to the image forming apparatus, the controller controls the communication interface to transmit information corresponding to the selected image forming apparatus and the user information to the managing server for requesting the managing server to set the authority for the selected image forming apparatus,
   wherein pre-stored user information and authority information corresponding to each image forming apparatus stored in the managing server are automatically and periodically updated based on a user information database.

2. The host device as claimed in claim 1, wherein, if use permission information determined according to the information of the selected image forming apparatus and the user information is received from the managing server, the controller controls to perform an image forming job using the selected image forming apparatus.

3. The host device as claimed in claim 1, wherein, if use permission information or use non-permission information determined according to the information corresponding to the selected image forming apparatus and the user information is received from the managing server, the controller controls the display unit to display a use permission or non-permission state of the selected image forming apparatus.

4. The host device as claimed in claim 1, wherein the display unit displays a screen comprising a login menu, and, if the login menu is selected, displays a screen to receive the user information,
   wherein the controller transmits the input user information to the managing server, and, if a login completion signal is received from the managing server, controls the display unit to display information corresponding to at least one image forming apparatus connected to the host device.

5. The host device as claimed in claim 4, wherein the display unit displays at least one of a search menu to search an image forming apparatus connected to the host device, a view menu to display information corresponding to the searched image forming apparatus, and a selecting menu to select at least one of the searched image forming apparatus, after the login menu.

6. The host device as claimed in claim 5, further comprising a storage unit,
   wherein if the search menu is selected, the controller detects at least one of a name, IP information, driver information, serial number information, state information, toner information, and JAC setting information of the at least one image forming apparatus connected to host device, and stores the detected information in the storage unit and displays the detected information.

7. A managing server connected to a host device that is connected to a plurality of image forming apparatuses, comprising:
   a storage unit to store user information and authority information corresponding to each image forming apparatus and to automatically update periodically the stored user information and authority information according to the user information provided from a user information database;
   a display unit to display information corresponding to the image forming apparatuses connected to the host device after a login to the managing server has been performed, such that the displayed information includes at least three of a name, Internet Protocol (IP) information, driver information, serial number information, state information, toner information, and job accounting (JAC) setting information of the image forming apparatuses connected to the host device;
   a communication interface to receive user information input at the host device and information corresponding to at least one image forming apparatus selected at the host device; and
   a controller to compare the information received through the communication interface and the information stored in the storage unit and determine whether a user of the host device has authority to use the selected image forming apparatus, and notify the host device and the image forming apparatus of a result of determination,
   wherein, if the authority to use the selected image forming apparatus of the user of the host device is permitted, the controller updates the information of the storage unit automatically according to the information received through the communication interface.

8. The managing server as claimed in claim 7, further comprising a user interface to receive the user information and the authority information corresponding to each image forming apparatus.

9. The managing server as claimed in claim 8, further comprising a display unit to display the user information and the authority information corresponding to each image forming apparatus.

10. A method of controlling image formation of a host device that is connected to a plurality of image forming apparatuses and a managing server, the method comprising:
    receiving user information to log in the managing server;
    transmitting the user information to the managing server;
    displaying information corresponding to the image forming apparatuses connected to the host device after a login to the managing server has been performed, such that the displayed information includes at least three of a name, Internet Protocol (IP) information, driver information, serial number information, state information, toner information, and job accounting (JAC) setting information of the image forming apparatuses connected to the host device;
    selecting at least one image forming apparatus from the displayed information corresponding to the image forming apparatus; and
    transmitting information on the selected image forming apparatus and the user information to the managing server for requesting the managing server to set the authority for the selected image forming apparatus,
    wherein pre-stored user information and authority information corresponding to each image forming apparatus stored in the managing server are automatically and periodically updated based on a user information database.

11. The method as claimed in claim 10, further comprising, if use permission information determined according to the information on the selected image forming apparatus and the user information is received from the managing server, performing an image forming job using the selected image forming apparatus.

12. The method as claimed in claim 10, further comprising, if use permission information or use non-permission information determined according to the information corresponding to the selected image forming apparatus and the user information is received from the managing server, displaying a use permission or non-permission state of the selected image forming apparatus.

13. The method as claimed in claim 10, wherein the receiving the user information comprises displaying a screen comprising a login menu and displaying a screen to receive the user information, if the login menu is selected,
    wherein the displaying the information corresponding to the image forming apparatus connected to the host device comprises, if a login completion signal is received from the managing server, displaying information on at least one image forming apparatus connected to the host device.

14. The method as claimed in claim 13, further comprising displaying at least one of a search menu to search an image forming apparatus connected to the host device, a view menu to display information on the searched image forming apparatus, and a selecting menu to select one of the searched image forming apparatus, after the login menu.

15. The method as claimed in claim 14, further comprising if the search menu is selected, detecting and storing at least one of a name, IP information, driver information, serial number information, state information, toner information, and JAC setting information of at least one image forming apparatus connected to the host device; and
    displaying the detected and stored information.

16. A method of controlling image formation of a managing server connected to a host device that is connected to a plurality of image forming apparatuses, the method comprising:

receiving user information from a user information database and automatically and periodically updating pre-stored user information and authority information corresponding to the each image forming apparatus stored on the managing server, according to the received information;

receiving user information input at the host device and the information on at least one image forming apparatus selected to be used at the host device;

displaying information corresponding to the image forming apparatuses connected to the host device after a login to the managing server has been performed, such that the displayed information includes at least three of a name, Internet Protocol (IP) information, driver information, serial number information, state information, toner information, and job accounting (JAC) setting information of the image forming apparatuses connected to the host device;

comparing the received information and the updated information and determining whether a user of the host device has authority to use the selected image forming apparatus, and notifying the host device and the image forming apparatus of the authority of the user; and if the authority to use the selected image forming apparatus of the user of the host device is permitted, automatically updating the updated information according to the received information.

17. The method as claimed in claim 16, further comprising receiving the user information and the authority information corresponding to each image forming apparatus.

18. The method as claimed in claim 17, further comprising displaying the user information and the authority information corresponding to each image forming apparatus.

19. A non-transitory recording medium in which a program code to perform a method of controlling image formation of a host device that is connected to a plurality of image forming apparatuses and a managing server is stored, the method of controlling the image formation comprising:

receiving user information to log in the managing server;

transmitting the user information to the managing server;

displaying information corresponding to the image forming apparatuses connected to the host device after a login to the managing server has been performed, such that the displayed information includes at least three of a name, Internet Protocol (IP) information, driver information, serial number information, state information, toner information, and job accounting (JAC) setting information of the image forming apparatuses connected to the host device;

selecting at least one image forming apparatus from the displayed information corresponding to the image forming apparatus; and transmitting information corresponding to the selected image forming apparatus and the user information to the managing server for requesting the managing server to set the authority for the selected image forming apparatus, wherein pre-stored user information and authority information corresponding to each image forming apparatus stored in the managing server are automatically and periodically updated based on a user information database.

20. The non-transitory recording medium as claimed in claim 19, further comprising, if use permission information or use non-permission information determined according to the information corresponding to the selected image forming apparatus and the user information is received from the managing server, displaying a use permission or non-permission state of the selected image forming apparatus.

21. The host device as claimed in claim 1, wherein the controller controls the display unit to display the display information, such that the display information includes a degree of availability corresponding to at least one of print, scan, copy, and fax.

* * * * *